(12) United States Patent
Hashimoto et al.

(10) Patent No.: US 6,695,471 B2
(45) Date of Patent: Feb. 24, 2004

(54) METHOD AND APPARATUS FOR MEASURING TEMPERATURE OF MOVABLE OBJECT

(75) Inventors: Etsu Hashimoto, Fujisawa (JP); Yoshitada Katagiri, Tokyo (JP); Tetsuo Abe, Higashikuruma (JP); Yoshio Suzuki, Akishima (JP)

(73) Assignee: Nippon Telegraph and Telephone Corporation (JP)

( * ) Notice: Subject to any disclaimer, the term of this patent is extended or adjusted under 35 U.S.C. 154(b) by 0 days.

(21) Appl. No.: 10/180,655

(22) Filed: Jun. 26, 2002

(65) Prior Publication Data

US 2003/0007545 A1 Jan. 9, 2003

(30) Foreign Application Priority Data

Jun. 27, 2001 (JP) ...................... P2001-193975

(51) Int. Cl.[7] ................................. G01K 1/16
(52) U.S. Cl. .................. 374/134; 374/169; 702/130
(58) Field of Search ................ 374/120, 134, 374/135, 29, 169; 702/130

(56) References Cited

U.S. PATENT DOCUMENTS

| 4,433,923 A | * | 2/1984 | Rascati et al. | ............... 374/120 |
|---|---|---|---|---|
| 4,501,504 A | * | 2/1985 | Urmenyi et al. | ............. 374/120 |
| 5,735,604 A | * | 4/1998 | Ewals et al. | ................. 374/134 |
| 5,884,235 A | * | 3/1999 | Ebert | .......................... 702/130 |
| 6,270,252 B1 | * | 8/2001 | Siefert | ......................... 374/102 |
| 2001/0044703 A1 | | 11/2001 | Yoda | |

FOREIGN PATENT DOCUMENTS

| DE | 3803336 | 8/1989 |
|---|---|---|
| JP | 09-113382 | 5/1997 |
| WO | WO 00/70316 | 11/2000 |

OTHER PUBLICATIONS

B. Saggin et al., "Dynamic Error Correction of a Thermometer for Atmospheric Measurements," Measurement 30:3 pp. 223–230, Oct. 2001.

* cited by examiner

Primary Examiner—Diego Gutierrez
Assistant Examiner—Stanley J. Pruchnic, Jr.
(74) Attorney, Agent, or Firm—Kilpatrick Stockton LLP

(57) ABSTRACT

A temperature meter for measuring temperature of a measurement target object to which a temperature sensor cannot be fixed directly is formed by a temperature sensor configured to measure an observed temperature in a vicinity of the measurement target object; a timer configured to measure a temperature observation time; and a calculation processor configured to calculate the temperature of the measurement target object according to the observed temperature and the temperature observation time by carrying out a prescribed calculation processing.

12 Claims, 12 Drawing Sheets

TEMPERATURE OF MEASUREMENT TARGET OBJECT
≈ TEMPERATURE OF OTHER OBJECT

TEMPERATURE OF MEASUREMENT TARGET OBJECT
≈ SYNTHESIZED TEMPERATURE OF PLURAL
TEMPERATURE MEASUREMENT SYSTEMS $\therefore T_{obj}(t_1) = G_{in} \cdot f(\Delta t_{obs}) \Delta t_{obs} + T_{obj}(t_0)$  WHERE  $\Delta t_{obs} \leqq \Delta t_{th}$ $T_{obj}(t_1) = dT_{max} \Delta t_{obs} + T_{obj}(t_0)$  WHERE  $\Delta t_{obs} > \Delta t_{th}$

METHOD AND APPARATUS FOR MEASURING TEMPERATURE OF MOVABLE OBJECT

BACKGROUND OF THE INVENTION

1. Field of the Invention

The present invention relates to temperature measurement method and apparatus capable of realizing accurate temperature measurement of a measurement target object whose temperature is difficult to measure directly as it is a movable object to which a temperature sensor cannot be fixed directly but there is a need to monitor its temperature constantly or frequently, even when there is a transient temperature change.

2. Description of the Related Art

The most popular and simple method for measuring temperature of an object to which a temperature sensor cannot be set in contact directly such as a movable object is a method as shown in FIG. 10, in which an atmospheric temperature in vicinity of a measurement target object 101 is measured by a thermometer 103 by using a temperature sensor 102 arranged in vicinity of the measurement target object, 101 and this temperature is regarded as the temperature of the measurement target object 101. For the temperature sensor, a thermistor, a thermocouple, and a resistance temperature detector are often used. When a correspondence between the temperature sensor 102 and the temperature of the measurement target object 101 is calibrated in advance under a stable temperature condition such as that of a temperature controlled box, the temperature indicated by the thermometer 103 agrees with the actual temperature of the measurement target object 101 very well under a static environment.

Also, as a method for measuring temperature of a movable object including a transient temperature change, there is a method for measuring temperature indirectly by measuring another observation value which changes as the temperature changes. For example, when a radiation thermometer is used, the temperature can be measured according to infrared rays emitted from an object.

Also, when a measurement target object is an object through which lights can transmit, there is a method as shown in FIG. 11 in which temperature is measured according to a transmission wavelength which varies as the temperature of the object changes. FIG. 11 shows a method in which a white light from a white light source 202 is incident on a measurement target object 201 having a light transmitting characteristic, a transmission wavelength which varies as the temperature changes is observed by an optical spectrum analyzer 203, and the temperature is measured from a conversion table 204 between transmission wavelengths and temperatures, which is calibrated in advance.

As described above, in order to measure temperature of a measurement target object whose temperature is difficult to measure directly as it is a movable object to which a temperature sensor cannot be fixed directly but there is a need to monitor its temperature constantly or frequently, the methods as shown in FIG. 10 and FIG. 11 have been used conventionally. However, these conventional methods have drawbacks such as that the accurate temperature measurement cannot be realized when there is a transient temperature change, or that it is costly.

Namely, the method for measuring the temperature in vicinity of the measurement target object by using the temperature sensor and regarding this temperature as the temperature of the measurement target object has a drawback that, as shown in FIG. 10, there is a transient difference between the temperature characteristics 107 and 108 of the measurement target object 101 and the temperature sensor 102 due to a difference in the thermal capacity or the like, and there can be cases where this difference causes as a transient temperature error 109.

Also, the method for indirectly measuring the temperature of the measurement target object by measuring another observation value which varies as the temperature changes in a non-contact manner has a drawback that method and apparatus for measuring these observation values are more complicated, larger, and more costly, compared with the method using the temperature sensor.

For example, a temperature meter using a combination of a thermistor and a thermometer will only costs about several thousand yen, whereas one using an optical spectrum analyzer as shown in FIG. 11 will cost as much as several million yen. Consequently, from viewpoints of size and cost, it is not preferable to use a device such as the optical spectrum analyzer in the application that requires the constant or frequent temperature monitoring, although there can be cases where the optical spectrum analyzer is temporarily used in the application such as that for collecting temperature calibration data.

BRIEF SUMMARY OF THE INVENTION

It is therefore an object of the present invention to provide a temperature measurement method capable of eliminating a transient temperature error that can be caused by the conventional temperature sensor, and a temperature meter using this method which is capable of measuring temperature accurately by using the conventional temperature sensor even under a transient circumstance in which temperature changes are frequent.

According to one aspect of the present invention there is provided a temperature measurement method for measuring temperature of a measurement target object to which a temperature sensor cannot be fixed directly, comprising: obtaining an observed temperature from the temperature sensor arranged in a vicinity of the measurement target object and a temperature observation time from a timer; and calculating the temperature of the measurement target object $T_{obj}$ according to the observed temperature and the temperature observation time by a calculation processing based on a following equation (C):

$$T_{obj}(t_1) = G_{in} \cdot f(\Delta t_{obs}) \cdot \Delta t_{obs} + T_{obj}(t_0) \qquad (C)$$

where $t_1$ is a current time at which the observed temperature is observed, $t_0$ is a time at which temperature was measured last time, $G_{in}$ is a time change rate of temperature applied to the measurement target object, $f(\Delta t_{obs})$ is a polynomial regarding $\Delta t_{obs}$, and $\Delta t_{obs}$ is a time interval by which temperature has been observed.

According to another aspect of the present invention there is provided a temperature meter for measuring temperature of a measurement target object to which a temperature sensor cannot be fixed directly, comprising: a temperature sensor configured to measure an observed temperature in a vicinity of the measurement target object; a timer configured to measure a temperature observation time; and a calculation processor configured to calculate the temperature of the measurement target object $T_{obj}$ according to the observed temperature and the temperature observation time by a calculation processing based on a following equation (C):

$$T_{obj}(t_1) = G_{in} \cdot f(\Delta t_{obs}) \cdot \Delta t_{obs} + T_{obj}(t_0) \quad (C)$$

where $t_1$ is a current time at which the observed temperature is observed, $t_0$ is a time at which temperature was measured last time, $G_{in}$ is a time change rate of temperature applied to the measurement target object, $f(\Delta t_{obs})$ is a polynomial regarding $\Delta t_{obs}$, and $\Delta t_{obs}$ is a time interval by which temperature has been observed.

According to another aspect of the present invention there is provided a computer usable medium having computer readable program codes embodied therein for causing a computer to function as a temperature meter for measuring temperature of a measurement target object to which a temperature sensor cannot be fixed directly, the computer readable program codes include: a computer readable program code for causing said computer to calculate the temperature of the measurement target object $T_{obj}$ according to an observed temperature obtained from a temperature sensor arranged in a vicinity of the measurement target object and a temperature observation time obtained from a timer, by a calculation processing based on a following equation (C):

$$T_{obj}(t_1) = G_{in} \cdot f(\Delta t_{obs}) \cdot \Delta t_{obs} + T_{obj}(t_0) \quad (C)$$

where $t_1$ is a current time at which the observed temperature is observed, $t_0$ is a time at which temperature was measured last time, $G_{in}$ is a time change rate of temperature applied to the measurement target object, $f(\Delta t_{obs})$ is a polynomial regarding $\Delta t_{obs}$, and $\Delta t_{obs}$ is a time interval by which temperature has been observed.

According to another aspect of the present invention there is provided a temperature measurement method for measuring temperature of a measurement target object to which a temperature sensor cannot be fixed directly, comprising: arranging another object which has transient temperature characteristics identical to those of the measurement target object, in a vicinity of the measurement target object; and measuring the temperature of the measurement target object according to an observed temperature obtained from the temperature sensor that is set in contact with the another object.

According to another aspect of the present invention there is provided a temperature meter for measuring temperature of a measurement target object to which a temperature sensor cannot be fixed directly, comprising: another object which has transient temperature characteristics identical to those of the measurement target object, and which is arranged in a vicinity of the measurement target object; and a temperature sensor that is set in contact with the another object, for measuring an observed temperature of the another object as the temperature of the measurement target object.

According to another aspect of the present invention there is provided a temperature measurement method for measuring temperature of a measurement target object to which a temperature sensor cannot be fixed directly, comprising: arranging a plurality of other objects which have mutually different transient temperature characteristics, in a vicinity of the measurement target object; and calculating the temperature of the measurement target object by weighted addition of observed temperatures obtained from a plurality of temperature sensors that are respectively set in contact with the plurality of other objects.

According to another aspect of the present invention there is provided a temperature meter for measuring temperature of a measurement target object to which a temperature sensor cannot be fixed directly, comprising: a plurality of other objects which have mutually different transient temperature characteristics, which are arranged in a vicinity of the measurement target object; a plurality of temperature sensors that are respectively set in contact with the plurality of other objects; and an adder configured to calculate the temperature of the measurement target object by weighted addition of observed temperatures obtained from the plurality of temperature sensors.

Other features and advantages of the present invention will become apparent from the following description taken in conjunction with the accompanying drawings.

DETAILED DESCRIPTION OF THE INVENTION

Figure 1:
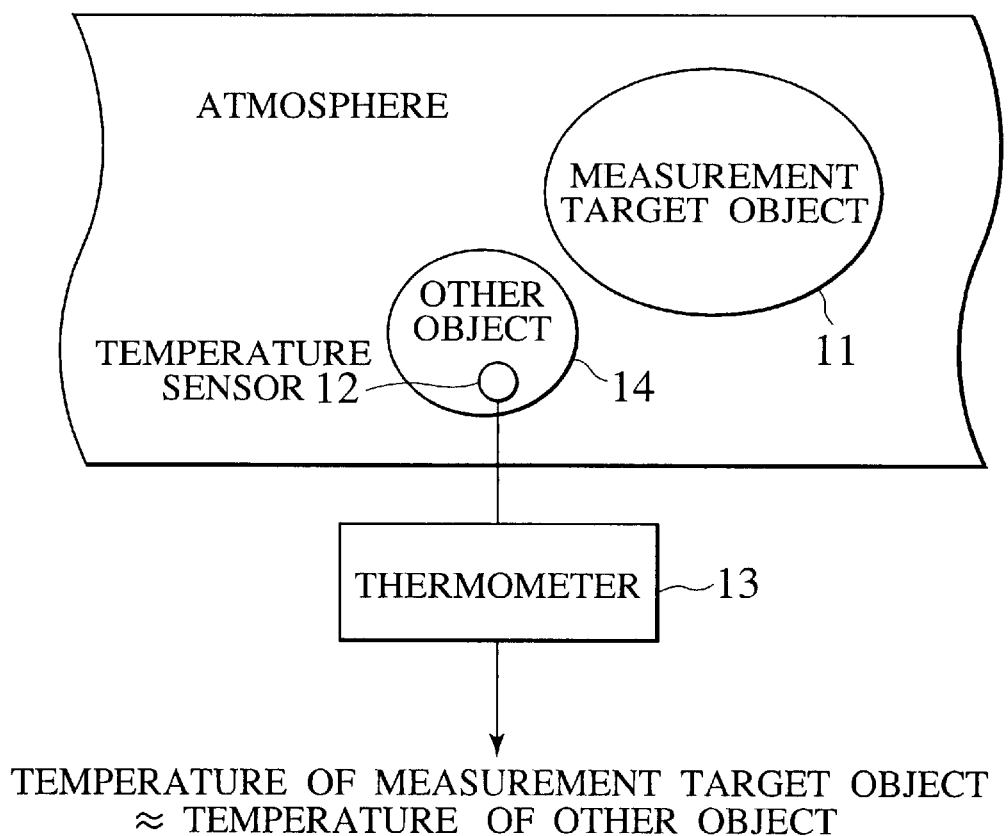
FIG. 1 is a schematic diagram showing a configuration of a temperature meter according to the first embodiment of the present invention.
Figure 2:
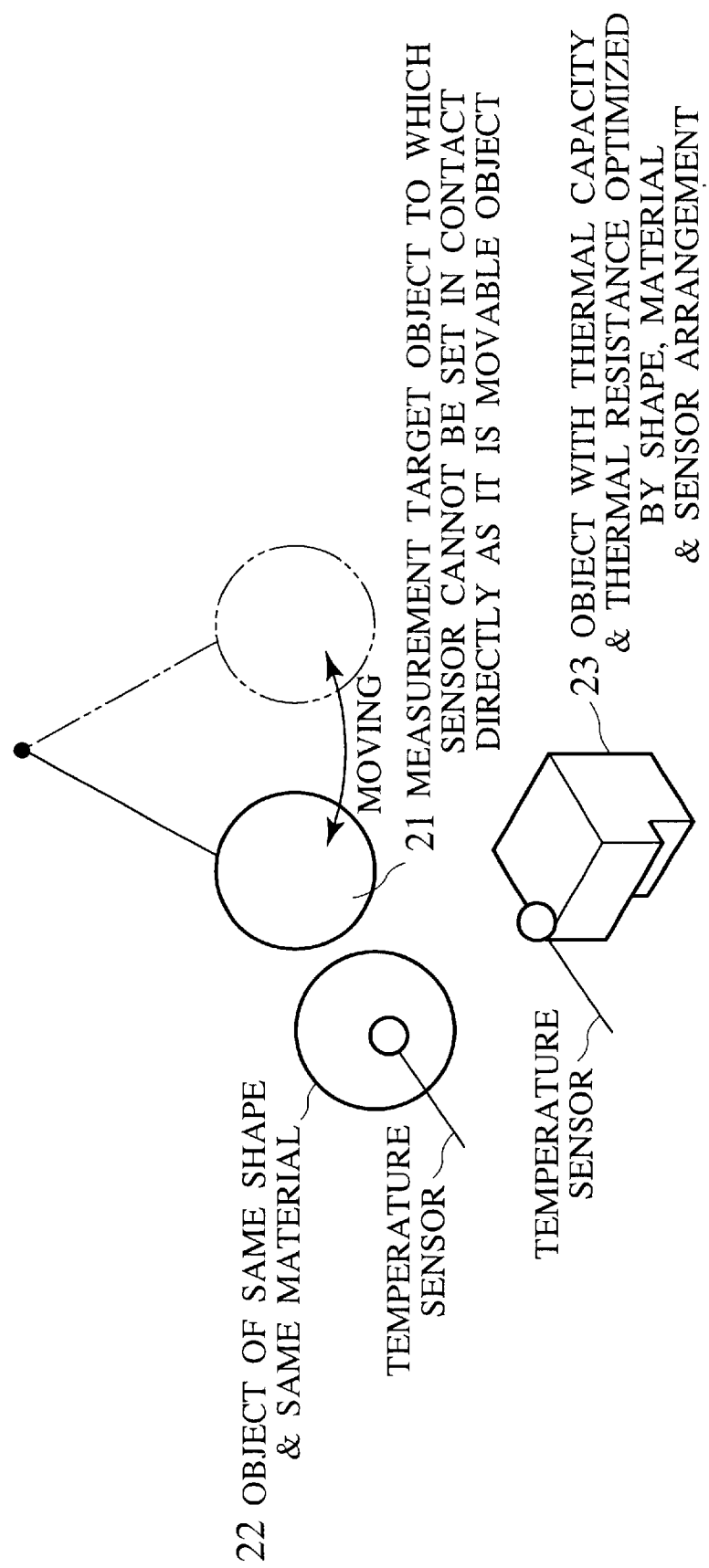
FIG. 2 is a diagram showing exemplary forms of object which has temperature characteristics identical to those of a measurement target object, to be used as other object in the temperature meter of FIG. 1.

Referring now to FIG. 1 and FIG. 2, the first embodiment of the present invention will be described in detail.

FIG. 1 shows a configuration of a temperature meter according to the first embodiment, which comprises a temperature sensor 12 for sensing temperature, a thermometer 13 for converting an electric signal from the temperature sensor 12 into temperature, and other object 14 which has temperature characteristics identical to those of a measurement target object 11. By setting the temperature sensor 12 in contact with this other object 14, the transient response of the temperature characteristics of the temperature sensor 12 is set to be identical to that of the measurement target object 11. For this reason, the temperature meter of the first embodiment is capable of detecting the temperature of the measurement target object 11 accurately even under the transient circumstance.

FIG. 2 shows examples of an object which has the temperature characteristics identical to those of a measurement target object 21, including an object 22 of exactly same shape and material, and an object 23 with thermal capacity and thermal resistance optimized by devising shape and material of the object and a position of the temperature sensor.

Figure 3:
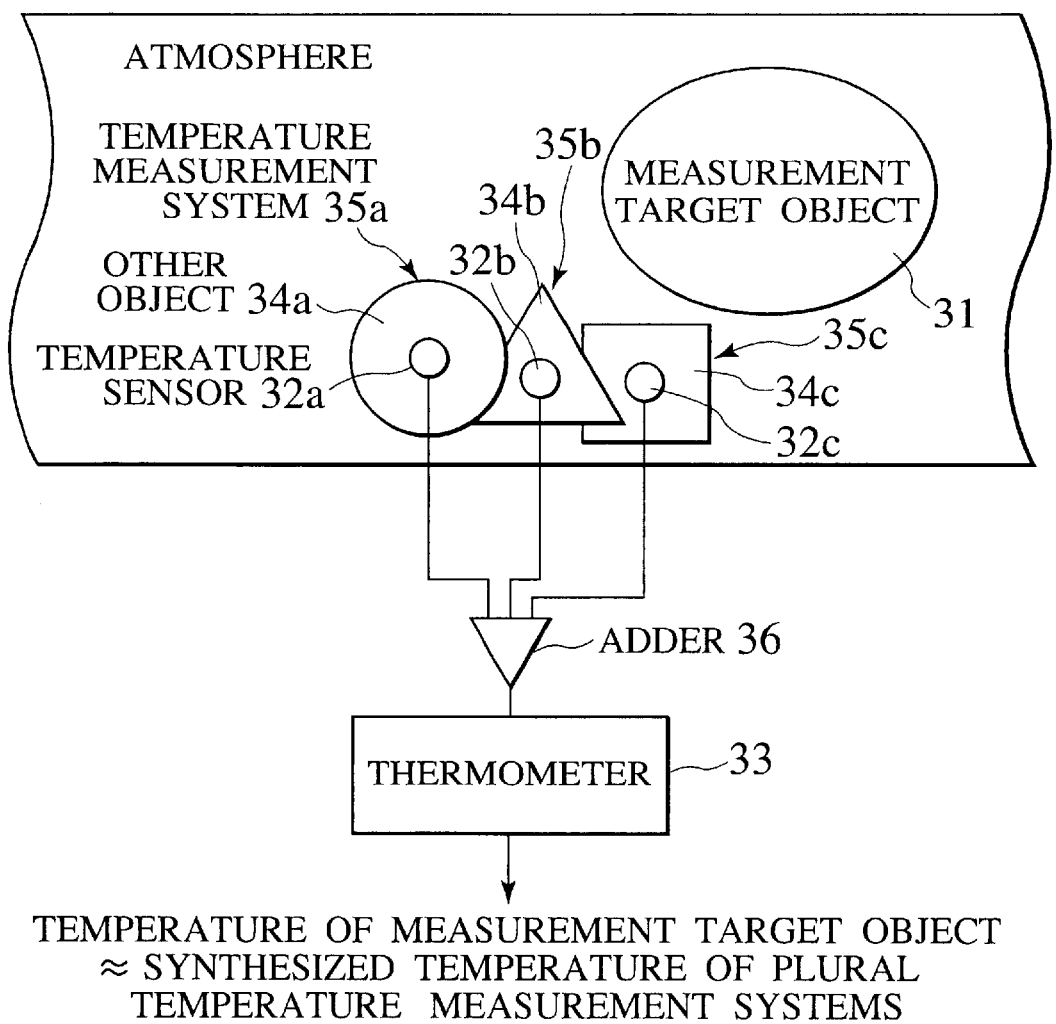
FIG. 3 is a schematic diagram showing a configuration of a temperature meter according to the second embodiment of the present invention.
Figure 4:
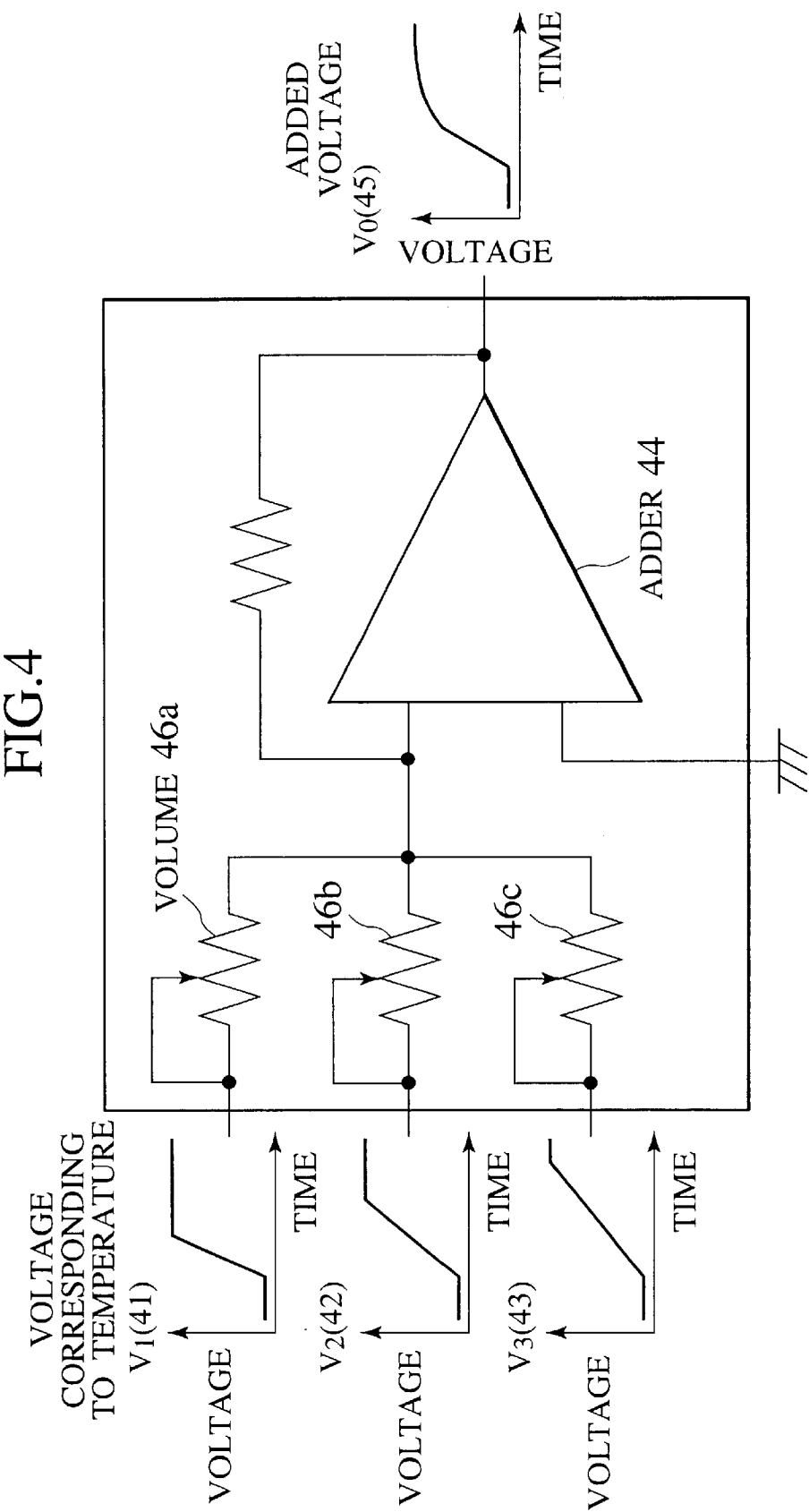
FIG. 4 is a circuit diagram showing an addition circuit to be used as an adder in the temperature meter of FIG. 3.

Referring now to FIG. 3 and FIG. 4, the second embodiment of the present invention will be described in detail.

FIG. 3 shows a configuration of a temperature meter according to the second embodiment, which has a plurality (three in this example) of temperature measurement systems 35a, 35b and 35c, which are formed by temperature sensors 32a, 32b and 32c for sensing temperature and other objects 34a, 34b and 34c, respectively, and which further comprises an adder 36 for adding electric signals from the plurality of temperature measurement systems 35a, 35b and 35c with appropriate weights, and a thermometer 33 for converting an electric signal from the adder 36 into temperature.

By setting sizes and materials of the other objects 34a, 34b and 34c differently, these temperature measurement systems 35a, 35b and 35c have mutually different temperature characteristics, and the temperature of a measurement target object 31 is taken to be a temperature obtained by weighting and averaging temperatures obtained from these temperature measurement systems 35a, 35b and 35c, such that the temperature characteristics of the temperature meter as a whole are set identical to those of the measurement target object 31.

This embodiment has an effect that the temperature characteristics can be adjusted easily to be identical to those of the measurement target object 31 by the adjustment of the weighting, compared with the case of setting the temperature characteristics of a single temperature sensor completely identical to those of the measurement target object.

FIG. 4 shows an addition circuit for weighting and adding electric signals from the plurality of temperature measurement systems 35a, 35b and 35c in this second embodiment. This addition circuit has an adder 44 for weighting and averaging input voltages $V_1$ (41), $V_2$ (42) and $V_3$ (43) corresponding to temperatures obtained from the temperature sensors 32a, 32b and 32c, and outputs a voltage $V_o$ (45) corresponding to a temperature of the measurement target object obtained by this adder 44. When weight factors with respect to the input voltages $V_1$, $V_2$ and $V_3$ are $\alpha$, $\beta$ and $\gamma$ (where $\alpha+\beta+\gamma=1$), the output voltage $V_o$ can be expressed as the following equation (F).

$$\alpha \cdot V_1 + \beta \cdot V_2 + \gamma \cdot V_3 = V_o \tag{F}$$

The inputs of the adder 44 are provided with volumes 46a, 46b and 46c for adjusting the weight factors, such that it is possible to realize temperature characteristics of various measurement target objects by adjusting these volumes 46a, 46b and 46c independently.

In general, the weighted addition by this addition circuit is carried out according to the following equations (A) and (B):

$$T_\phi = \sum_{n=1}^{m} k_n \cdot T_n \tag{A}$$

$$\sum_{n=1}^{m} k_n = 1 \tag{B}$$

where $T_n$ is an observed temperature obtained from an n-th temperature sensor, $k_n$ is a weight factor for the n-th temperature sensor, $T_0$ is the temperature of the measurement target object, and m is a total number of the temperature sensors.

Figure 5:
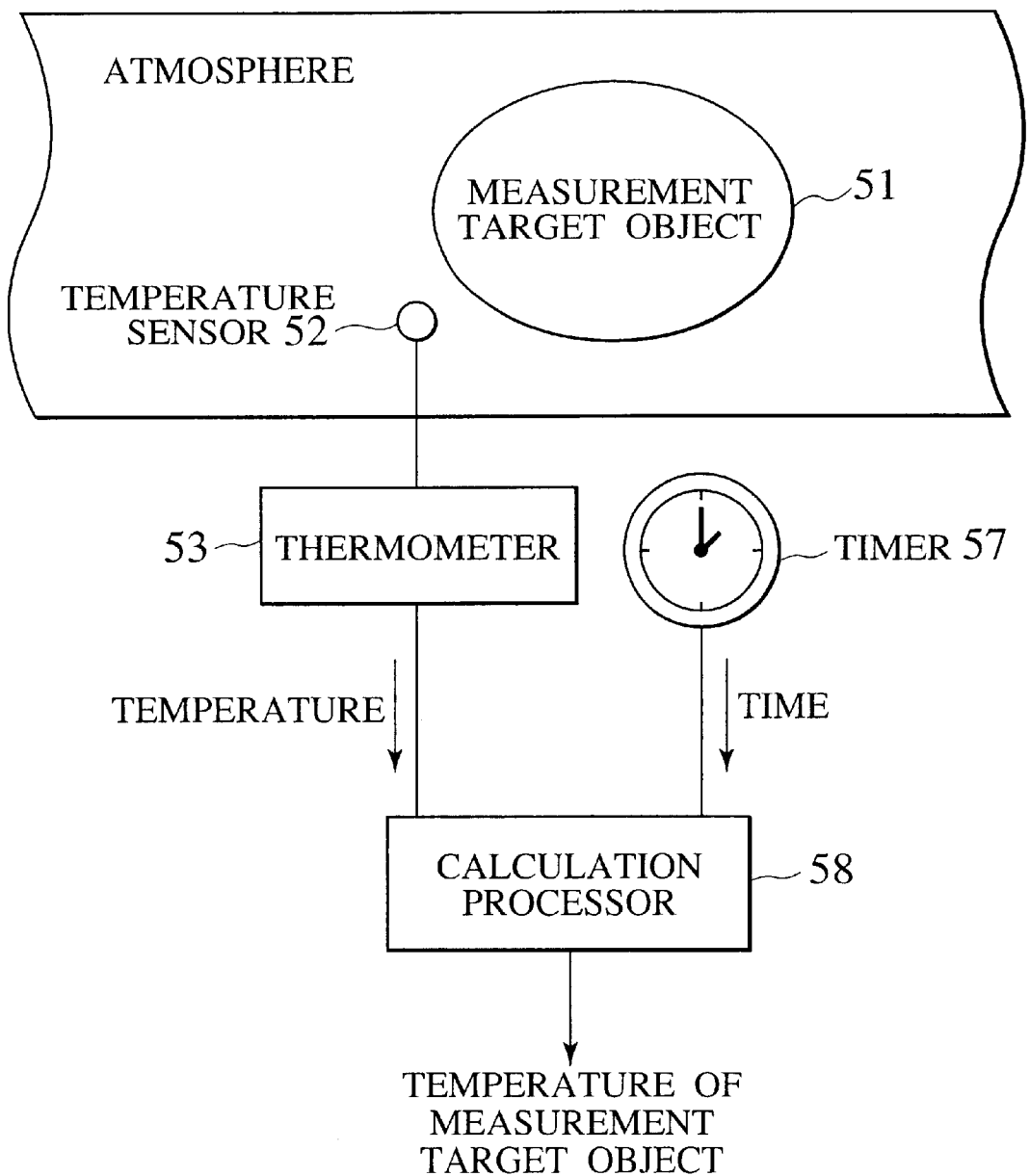
FIG. 5 is a schematic diagram showing a configuration of a temperature meter according to the third embodiment of the present invention.
Figure 6:
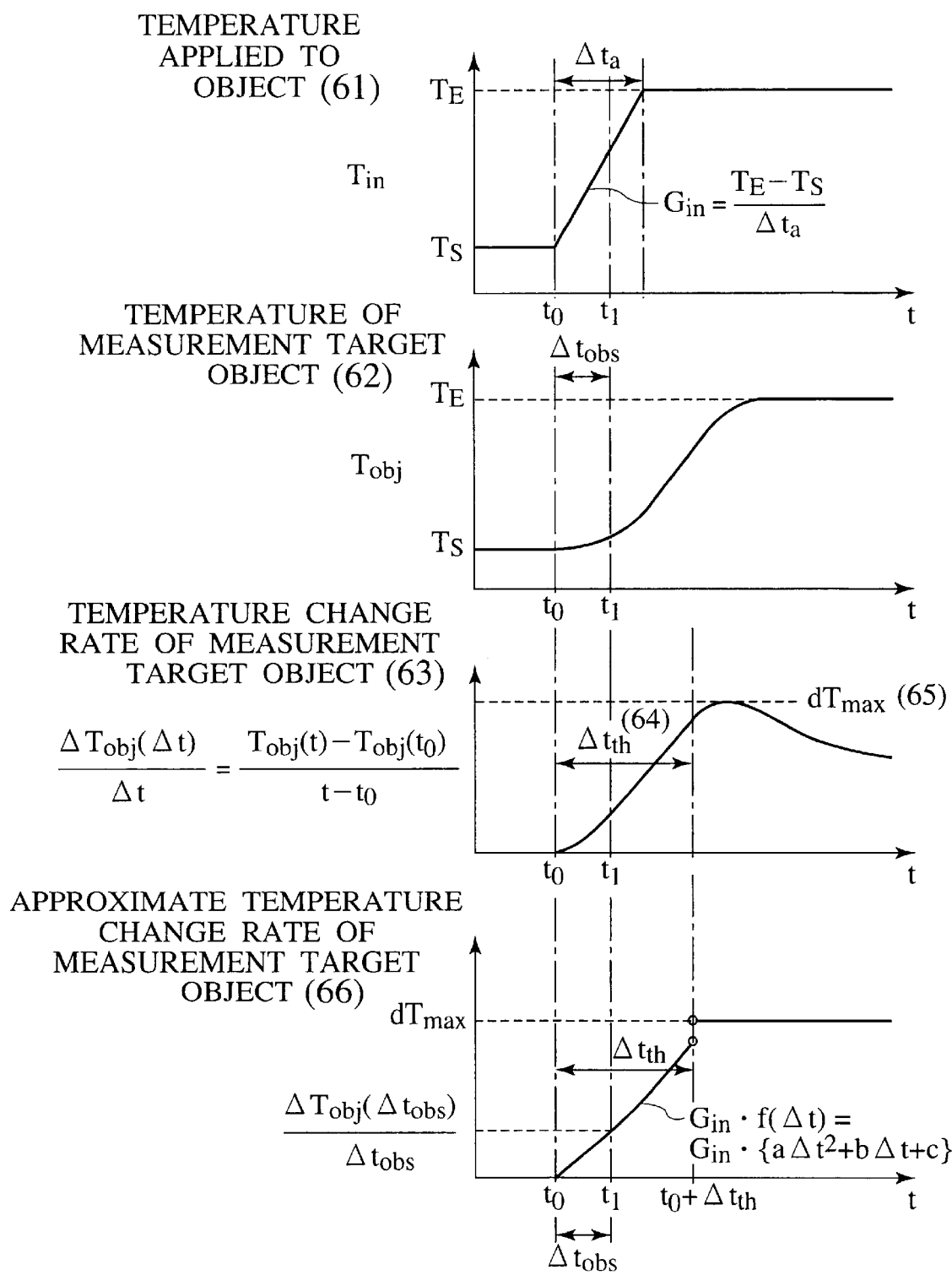
FIG. 6 is graphs for explaining a derivation of a formula for calculating temperature of a measurement target object, to be used in the temperature meter of FIG. 5.
Figure 7:
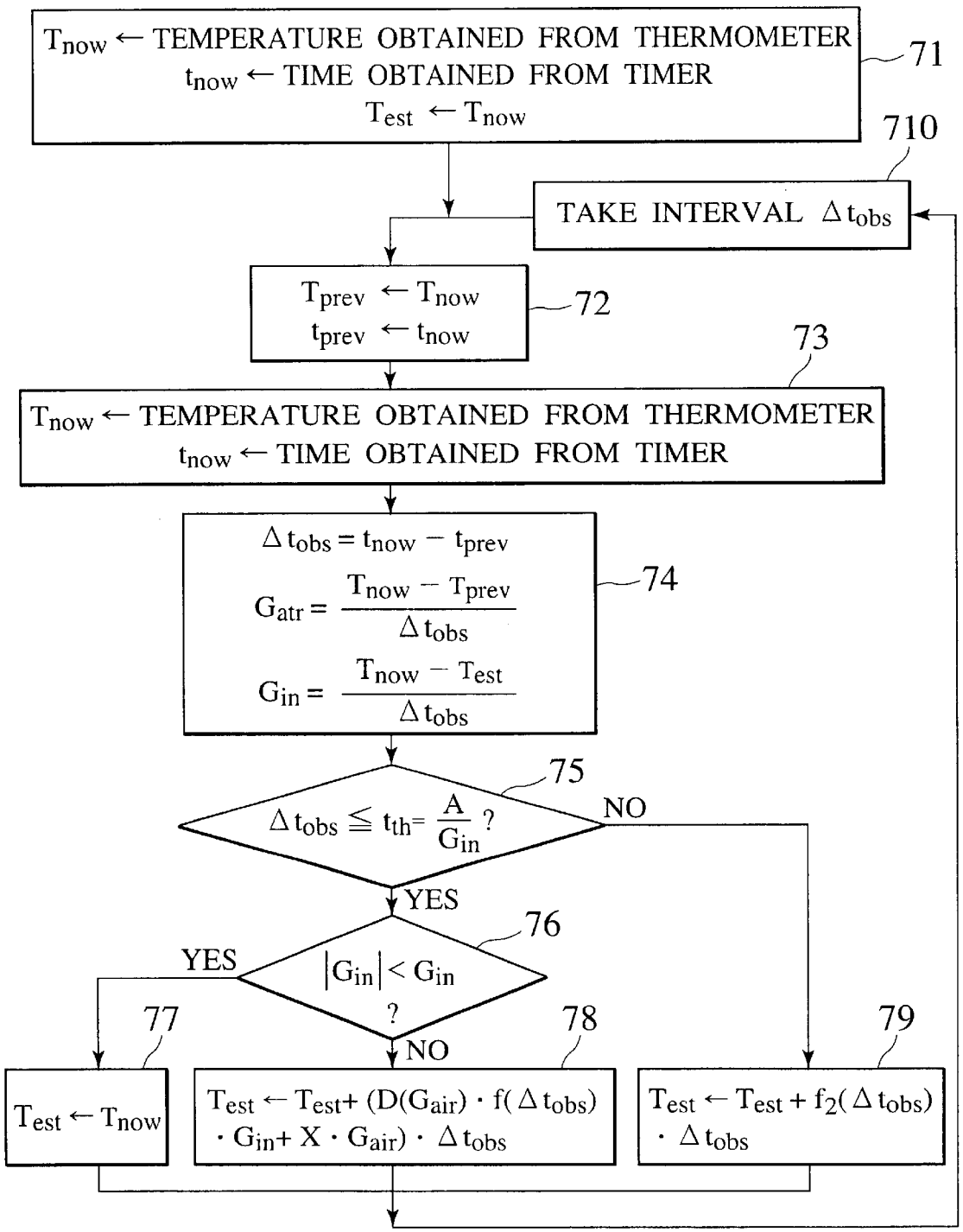
FIG. 7 is a flow chart showing an algorithm for calculating temperature of a measurement target object in the temperature meter of FIG. 5.

Referring now to FIG. 5 to FIG. 7, the third embodiment of the present invention will be described in detail.

FIG. 5 shows a configuration of a temperature meter according to the third embodiment, which comprises a temperature sensor 52 for sensing temperature, a thermometer 53 for converting an electric signal from the temperature sensor 52 into temperature and displaying it, a timer 57 for measuring a time at which the temperature is measured, and a calculation processor 58 for calculating temperature of a measurement target object 51 from values of temperature and time obtained from the thermometer 53 and the timer 57.

This embodiment has effects that there is no need to set the temperature characteristics of the temperature sensor 52 identical to those of the measurement target object 51, and the temperature characteristics of the measurement target object can be realized easily because the adjustment of the temperature characteristics is made by a processing method (software stage) of the calculation processor 58.

In this third embodiment, one formula for calculating the temperature $T_{obj}$ of the measurement target object 51 can be given by the following equation (C).

$$T_{obj}(t_1) = G_{in} \cdot f(\Delta t_{obs}) \cdot \Delta t_{obs} + T_{obj}(t_0) \tag{C}$$

where $t_1$ is a current time (at which temperature is observed), $t_0$ is a time at which temperature was measured last time, $G_{in}$ is a rate of change in time of temperature applied to the measurement target object, $f(\Delta t_{obs})$ is a polynomial regarding $\Delta t_{obs}$, and $\Delta t_{obs}$ is a time interval by which temperature has been observed.

FIG. 6 shows how the equation (C) is derived. In FIG. 6, $T_S$ denotes a temperature change start temperature, $T_E$ denotes a temperature change end temperature, $t_0$ denotes a temperature change detection start time, $t_1$ denotes a temperature change detection end time, $G_{in}$ denotes a temperature change rate, $T_{in}$ denotes a temperature applied to the object, $T_{obj}$ denotes a temperature of the measurement target object, $\Delta t_{obs}$ denotes an observation time interval, and $dT_{max}$ denotes an extremum.

When there is a change in the temperature applied to the object $T_{in}$ (61), the temperature of the measurement target object $T_{obj}$ (62) is also changed in response. At this point, the temperature change rate of the measurement target object (63) has a characteristic of changing linearly for some time interval $\Delta t_{th}$ (64) since the temperature change has started, and then reaching to the extremum $dT_{max}$ (65) and approaching to zero.

For this reason, the equation (C) can be obtained by expressing the linearly changing temperature change rate as a product of the change rate $G_{in}$ of the temperature applied to the object and an approximating polynomial $f(\Delta t)$ such as quadratic equation regarding the observation time interval.

In the case where the observation time interval $\Delta t_{obs}$ is greater than the time interval $\Delta t_{th}$, the extremum $dT_{max}$ is set as the temperature change rate of the measurement target object. Using the equation (C) and setting the time interval for observing temperature within $\Delta t_{th}$, it is possible to calculate temperature which agrees very well with the temperature of the measurement target object.

In this third embodiment, another formula for calculating the temperature $T_{obj}$ of the measurement target object 51 can be given by the following equation (D).

$$T_{obj}(t_1) = \{G_{in} \cdot f(\Delta t_{obs}) + X \cdot G_{air}\} \cdot \Delta t_{obs} + T_{obj}(t_0) \quad (D)$$

where X is a proportion factor and $G_{air}$ is a time change rate of the atmospheric temperature. This equation (D) differs from the equation (C) in that a gain proportional to the time change rate $G_{air}$ of the atmospheric temperature is added to the coefficient of the first term on the right hand side. By adding this gain term, it is possible to increase or decrease the temperature of the measurement target object to be calculated, according to the rate of the atmospheric temperature change.

In this third embodiment, another formula for calculating the temperature $T_{obj}$ of the measurement target object 51 can be given by the following equation (E).

$$T_{obj}(t_1) = \{D(G_{air}) \cdot G_{in} \cdot f(\Delta t_{obs})\} \cdot \Delta t_{obs} + T_{obj}(t_0) \quad (E)$$

where $D(G_{air})$ is a gain function. This equation (E) differs from the equation (C) in that the gain function $D(G_{air})$ expressed as a polynomial of a time change rate $G_{air}$ of the atmospheric temperature is multiplied to the coefficient of the first term on the right hand side. By multiplying this gain function, it is possible to increase or decrease the temperature of the measurement target object to be calculated, according to the rate of the atmospheric temperature change, similarly as the equation (D).

Both the equations (D) and (E) have the similar effect, so that either one of them can be used, or both of them can be used simultaneously as in the following equation (G).

$$T_{obj}(t_1) = \{D(G_{air}) \cdot G_{in} \cdot f(\Delta t_{obs}) + X \cdot G_{air}\} \cdot \Delta t_{obs} + T_{obj}(t_0) \quad (G)$$

FIG. 7 shows an algorithm in the case of calculating the temperature of the measurement target object by using a computer according to the above described calculation method. In this algorithm, a current value of a measurement target object temperature $T_{est}$ is calculated by using a current atmospheric temperature $T_{now}$ and a current time $t_{now}$ that are measured by the thermometer and the timer, as well as a previously calculated measurement target object temperature $T_{est}$, a previous atmospheric temperature $T_{prev}$, and a previous measurement time $t_{prev}$ that are stored in the memory.

First, the initialization is carried out to substitute values necessary for the subsequent calculation into variables $T_{now}$, $t_{now}$ and $T_{est}$ (step 71). The temperature calculation needs to be carried out regularly in time, so that it has a loop structure. Unless some interruption occurs, the temperature calculation is to be repeated at a time interval $\Delta t_{obs}$. The interruption is to be permitted at appropriate places. At a time of the start of the temperature calculation loop, values of the current temperature and time are substituted into the variables $T_{prev}$ and $t_{prev}$ for the previous measurement (step 72).

Next, the current temperature and time are measured by the thermometer and the timer, and substituted into variables $T_{now}$ and $t_{now}$ for the current measurement (step 73). Then, using these variables, the temperature observation time interval $\Delta t_{obs}$, a time change rate $G_{air}$ of the atmospheric temperature, and a time change rate $G_{in}$ of the temperature applied to the object are obtained (step 74)

Next, the conditional branching using whether the observation time interval $\Delta t_{obs}$ is not greater than some time interval $t_{th} = A/G_{in}$ or not as a judgement criterion is made (step 75). In FIG. 7, it is assumed that $t_{th}$ is inversely proportional to the time change rate $G_{in}$ of the temperature applied to the object, and its proportion factor is denoted as A. When $\Delta t_{obs}$ is not greater than $t_{th}$, another conditional branching using whether the absolute value of the time change rate $G_{in}$ of the temperature applied to the object is less than some positive threshold $G_{th}$ or not as a judgement criterion is made (step 76).

When the absolute value of $G_{in}$ is less than $G_{th}$, it is regarded that the temperature change is very small, and the current temperature $T_{now}$ is substituted into the object temperature $T_{est}$ (step 77). When the absolute value of $G_{in}$ is greater than or equal to $G_{th}$, the object temperature $T_{est}$ is calculated by using the equation (E) (step 78). When $\Delta t_{obs}$ is greater than $t_{th}$, the object temperature $T_{est}$ is calculated by setting the extremum $dT_{max}$ of FIG. 6 as the temperature change rate. In FIG. 7, this $dT_{max}$ is expressed as a function $f_2(\Delta t_{obs})$ of the observation time interval $\Delta t_{obs}$ (step 79).

The object temperature $T_{est}$ calculated by the step 77, 78 or 79 is the temperature of the measurement target object at time $t_{now}$. After the calculation of the object temperature, an appropriate observation time interval is taken (step 710) and the temperature calculation loop returns to the step 72.

Thereafter, the processing of the steps 72 to 710 is repeated unless the interruption occurs. This algorithm uses only five major variables that constantly require the memory, and the most complicated calculation formula used is only the quadratic equation, so that there is no need for a large capacity memory or a powerful CPU. Consequently, the inexpensive calculation processor intended for the built-in use is sufficient for the temperature calculation.

Figure 8:
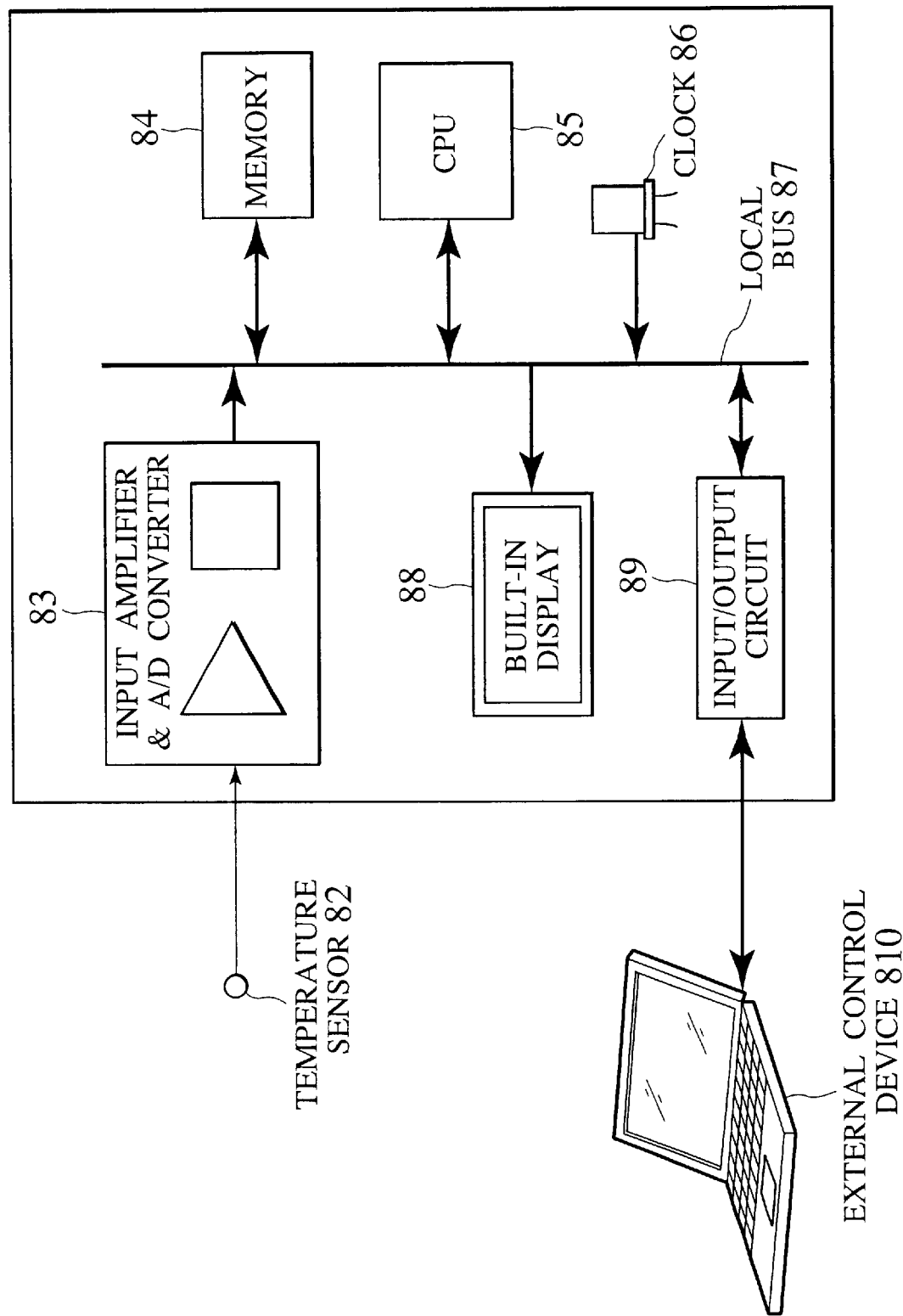
FIG. 8 is a schematic diagram showing a configuration of a temperature meter according to the fourth embodiment of the present invention.

Referring now to FIG. 8, the fourth embodiment of the present invention will be described in detail.

FIG. 8 shows a temperature meter circuit for a temperature meter that measures temperature according to the algorithm of FIG. 7, which comprises a memory 84, a CPU 85, a clock 86, and an input amplifier and A/D converter 83 for a temperature sensor 82, as well as a built-in display 88 and an input/output circuit 89 for carrying out communications with an external control device 810 according to the need, all of which are connected to a local bus 87.

The memory 84 is formed by ROM and RAM, where ROM stores a program according to the algorithm of FIG. 7 and initial value constants, and RAM stores constants and variables necessary for the temperature calculation.

According to the clock 86, a digital value from the temperature sensor 82 is received from the A/D converter 83 at a prescribed interval, and the temperature of the measurement target object at that point is calculated at the CPU 85 according to the received value. The calculation result is either displayed at the built-in display 88 or transmitted according to a request of the external control device 810.

By this temperature meter circuit, it becomes possible to form a module for the temperature measurement function of the present invention, so that it becomes possible to design the circuit in accordance with the CPU and the memory size suitable for the present invention. As a result, it is possible to realize an inexpensive circuit that takes advantages of the present invention that there is no need for a large capacity memory or a powerful CPU.

Figure 9:
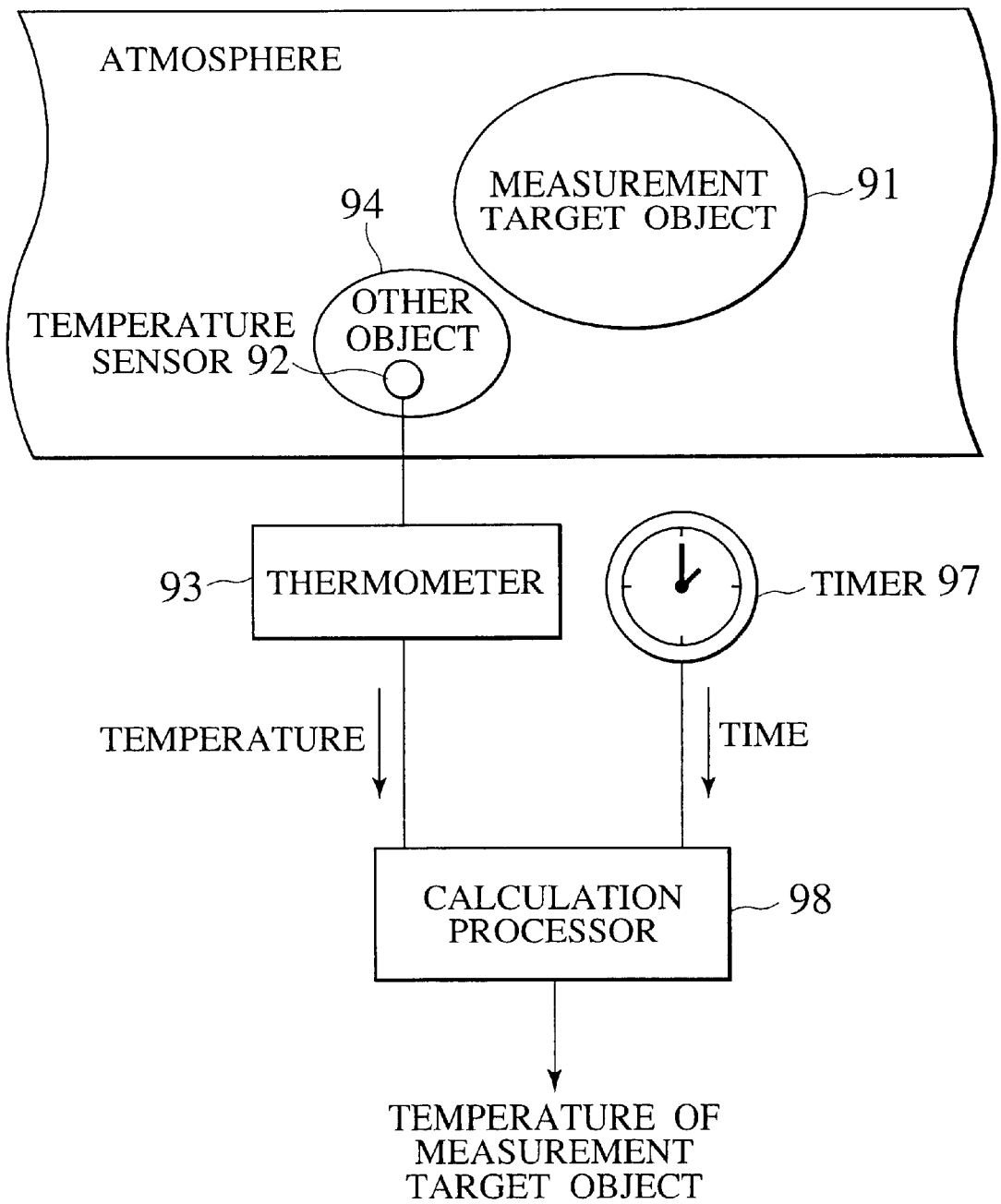
FIG. 9 is a schematic diagram showing a configuration of a temperature meter according to the fifth embodiment of the present invention.
Figure 10:
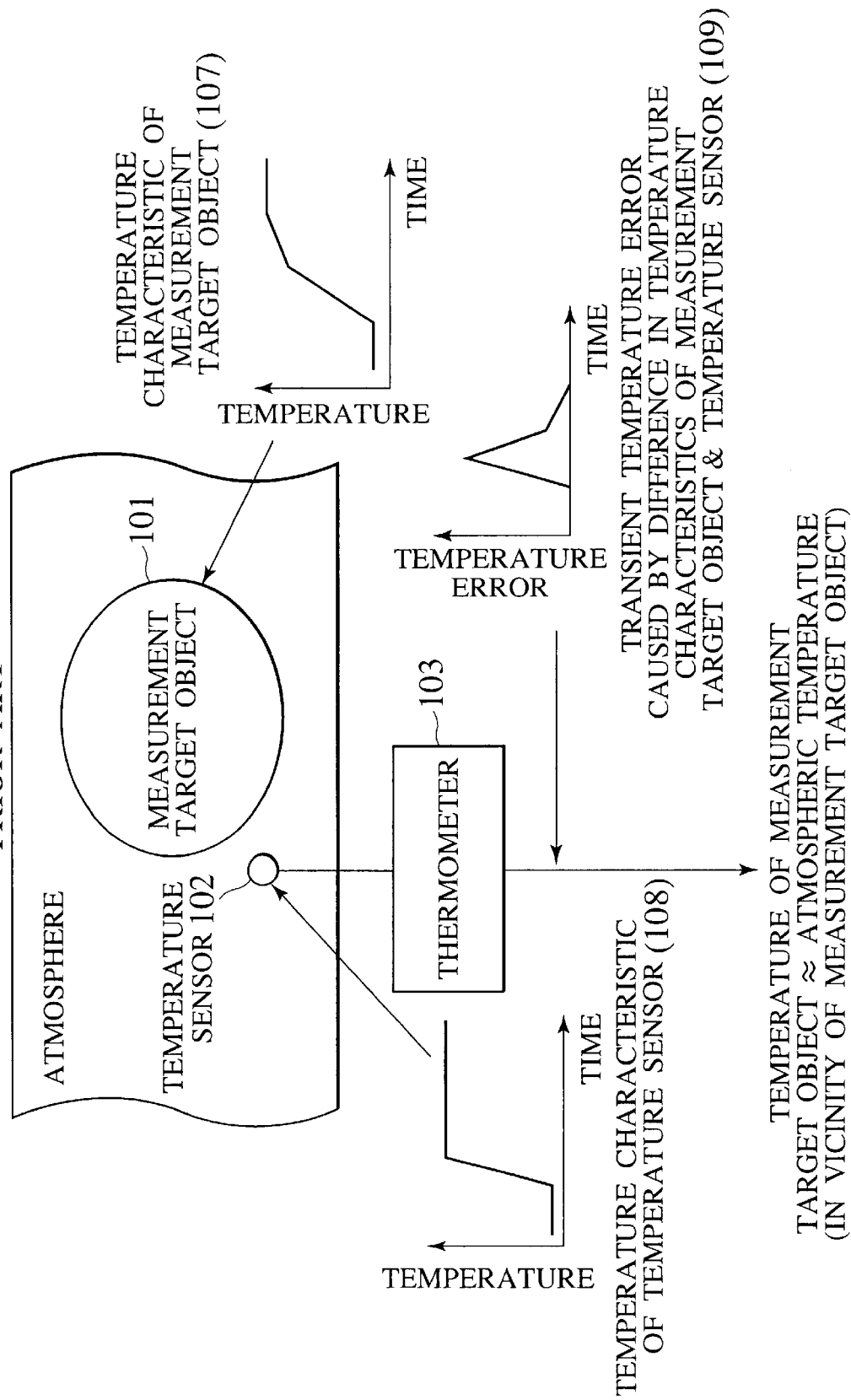
FIG. 10 is a schematic diagram showing one example of a conventional temperature meter for measuring temperature of a measurement target object to which a temperature sensor cannot be set in contact directly.
Figure 11:
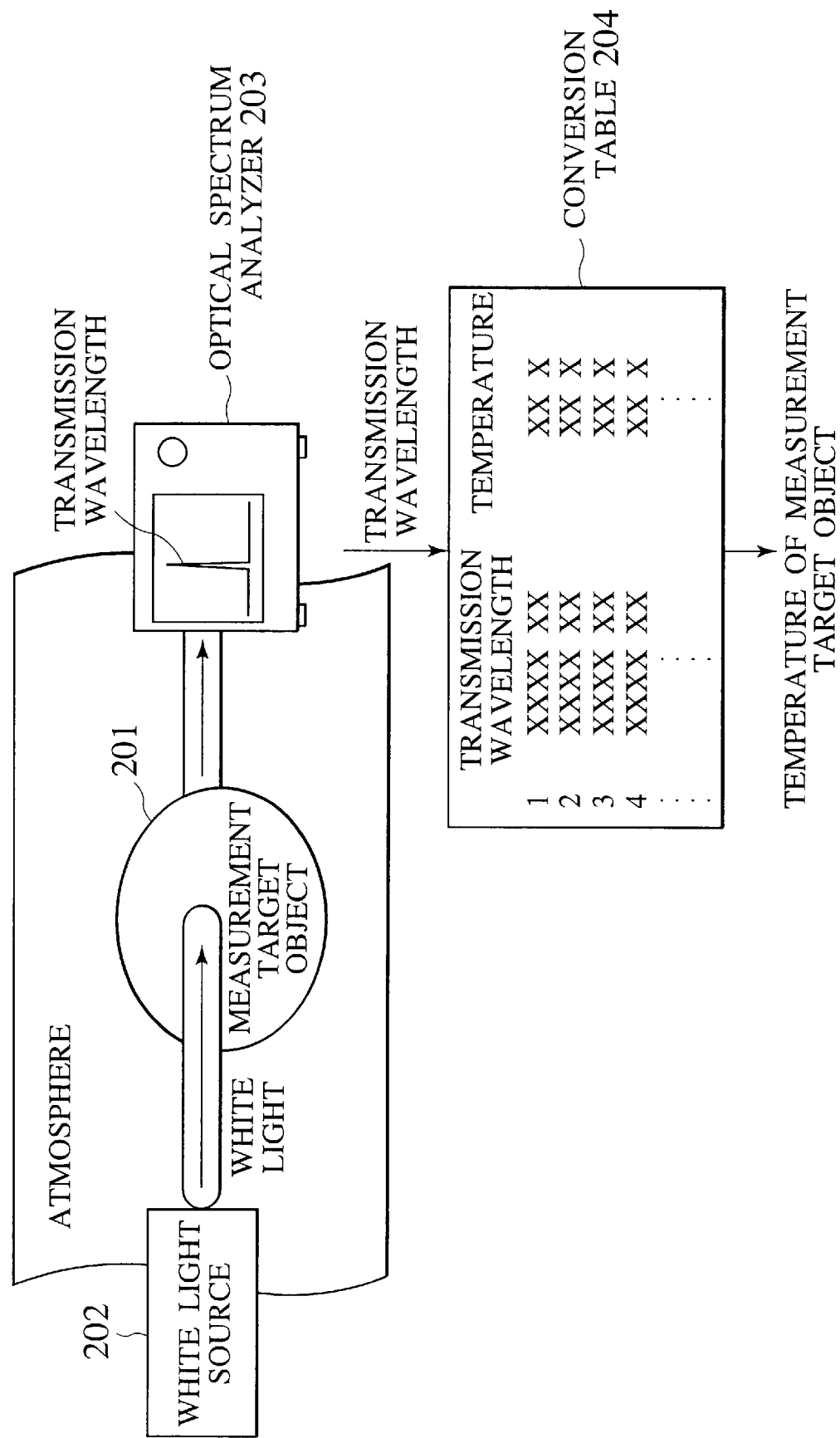
FIG. 11 is a schematic diagram showing another example of a conventional temperature meter for measuring temperature of a measurement target object to which a temperature sensor cannot be set in contact directly.

Referring now to FIG. 9, the fifth embodiment of the present invention will be described in detail.

FIG. 9 shows a temperature meter of the fifth embodiment which combines the temperature meter of the first embodiment and the temperature meter of the third embodiment, and comprises a temperature sensor 92 for sensing temperature, a thermometer 93 for converting an electric signal from the temperature sensor 92 into temperature and displaying it, other object 94 which has temperature characteristics identical to those of a measurement target object 91, a timer 97 for measuring a time at which the temperature is measured, and a calculation processor 98 for calculating temperature of a measurement target object 91 from values of temperature and time obtained from the thermometer 53 and the timer 57, while the temperature characteristics of the temperature sensor 92 including the transient response characteristic are set identical to those of the measurement target object 91 by setting the temperature sensor 92 in contact with the other object 94 which has temperature characteristics identical to those of the measurement target object 91.

In this configuration, compared with the first embodiment described above, a required precision by which the temperature characteristics of the temperature sensor 92 must be set identical to those of the measurement target object 91 can be relaxed, and any discrepancy in the temperature characteristics that remains after the setting of the temperature sensor 92 can be removed by the calculation processing, so that it becomes possible to realize the temperature measurement with smaller temperature error even with respect to the transient response.

Figure 12:
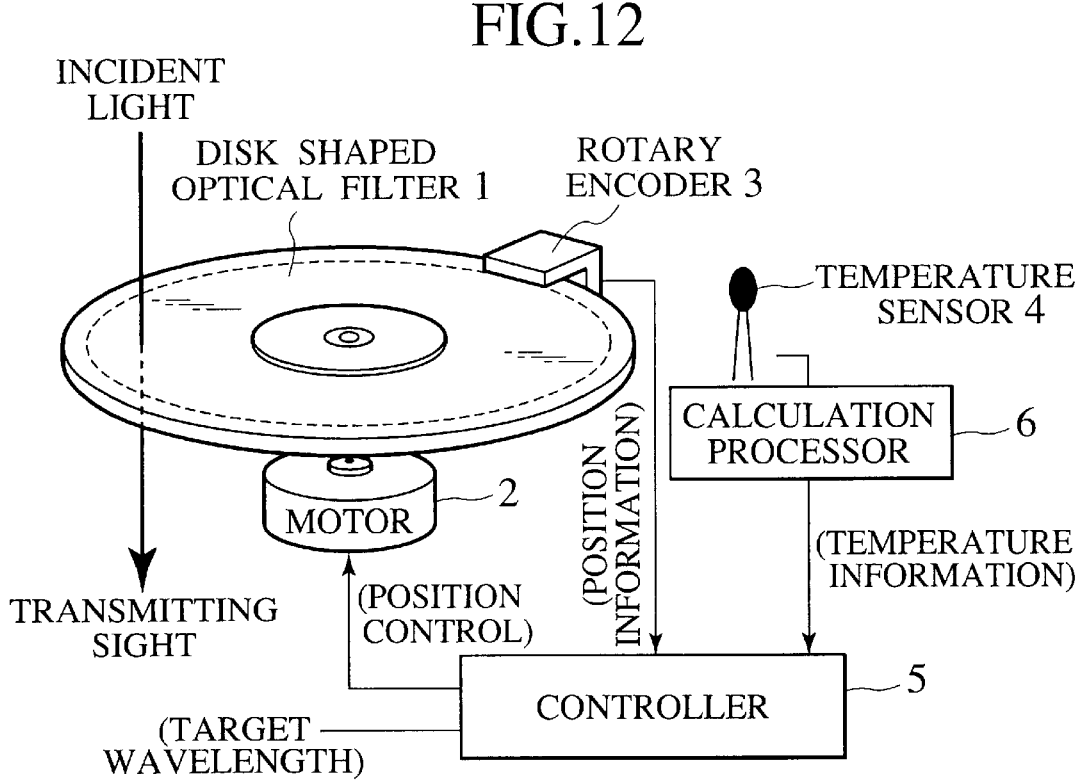
FIG. 12 is a schematic diagram showing a configuration of a variable wavelength optical filter device utilizing a temperature meter according to the present invention.
Figure 13A:
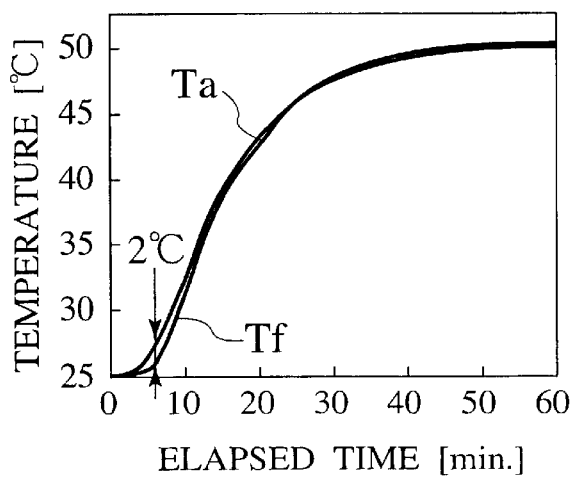
FIGS. 13A and 13B are graphs showing temperatures measured in the variable wavelength optical filter device of FIG. 12, with and without a calculation processor according to the present invention.
Figure 13B:
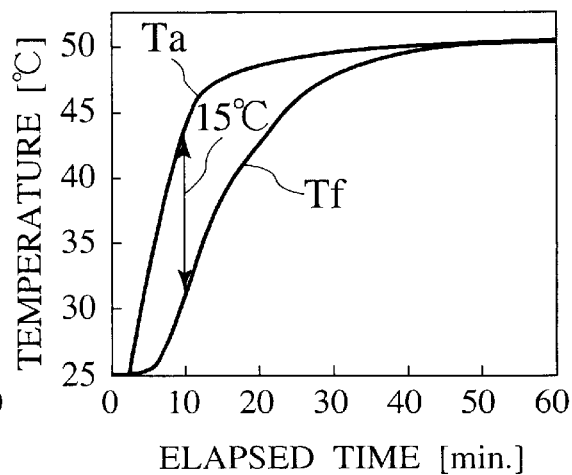

Referring now to FIG. 12 and FIGS. 13A and 13B, an exemplary application of the temperature meter of the present invention will be described.

FIG. 12 shows a configuration of a variable wavelength filter device utilizing the temperature meter of the present invention, which comprises a disk shaped optical filter 1 having a transmission wavelength that varies along a circumference direction, a motor 2 for rotating the optical filter 1, a rotary encoder 3 for detecting a position of the optical filter 1, a temperature sensor in a form of a resistance temperature detector for detecting temperature of the optical filter 1, a controller 5 for controlling the motor 2 by determining the position of the optical filter 1 according to the position information and the temperature information, a calculation processor 6 of the present invention. Note that the calculation processor 6 may be provided in a form of a software stored on a memory of the controller or in a form of a hardware programmed on PLD (programmable logic device).

In general, the transmission wavelength of the optical filter 1 changes depending on the temperature, so that there is a need to compensate this wavelength variation. In the variable wavelength filter device of FIG. 12, the temperature compensation is realized by controlling the position according to the amount of the temperature change. In order to realize the high precision temperature compensation, there is a need to accurately measure the temperature of the optical filter 1.

FIGS. 13A and 13B show the change of the actual filter temperature Tf and the filter temperature Ta as detected from the temperature sensor 4, when the atmospheric temperature is changed from 25° C. to 50° C., for the case of using the calculation processor 6 of the present invention (FIG. 13A) and the case of not using it (FIG. 13B). Here, the actual filter temperature is obtained by converting the amount of change of the transmission wavelength observed by the spectrum analyzer. In the case of not using the calculation processor 6 (FIG. 13B), the temperature error of nearly 15° C. was caused at a time of the temperature rising, whereas in the case of using the calculation processor 6 (FIG. 13A), the temperature error was suppressed to be less than 2° C. This fact demonstrates the effect of the present invention that the true filter temperature can be measured at a superior precision by adding the calculation processor 6 to the temperature sensor.

As described, in the present invention, an object which has the transient temperature characteristics identical to those of the measurement target object is arranged in a vicinity of the measurement target object, and the temperature of the measurement target object is measured from a temperature obtained by the temperature sensor that is set in contact with that object, so that the temperature of the measurement target object to which the sensor cannot be fixed directly can be measured accurately even under the transient circumstance.

Also, in the present invention, a plurality of temperature measurement systems formed by a plurality of objects with different transient temperature characteristics and temperature sensors that are set in contact with these objects is arranged in a vicinity of the measurement target object, and the temperature of the measurement target object is measured by the weighted addition processing of the temperatures measured by these temperature measurement systems, so that the temperature measurement in accordance with the temperature characteristics of the measurement target object can be realized easily.

Also, in the present invention, the temperature of the measurement target object is calculated by the calculation processing according to the temperature measured by the temperature sensor arranged in a vicinity of the measurement target object and the temperature measurement time measured by the timer, so that it becomes possible to accurately measure the temperature of the measurement target object even under the transient circumstance, without setting the temperature characteristics of the temperature sensor identical to those of the measurement target object.

Also, in the present invention, the temperature meter circuit as a module for the temperature measurement function can be formed, so that it is possible to realize an inexpensive temperature meter.

Also, in the present invention, an object which has the transient temperature characteristics identical to those of the measurement target object is arranged in a vicinity of the measurement target object, and the temperature of the measurement target object is calculated by the calculation processing according to the temperature measured by the temperature sensor that is set in contact with that object and the temperature measurement time measured by the timer, so that it becomes possible to accurately measure the temperature of the measurement target object even under the transient circumstance, and it becomes possible to realize the temperature measurement with smaller temperature error with respect to the transient response even when a precision of the temperature characteristics matching is relaxed.

It is to be noted that the above described embodiments according to the present invention may be conveniently implemented using a conventional general purpose digital computer programmed according to the teachings of the present specification, as will be apparent to those skilled in the computer art. Appropriate software coding can readily be prepared by skilled programmers based on the teachings of the present disclosure, as will be apparent to those skilled in the software art.

In particular, the calculation processor of the third and fifth embodiments can be conveniently implemented in a form of a software package.

Such a software package can be a computer program product which employs a storage medium including stored computer code which is used to program a computer to perform the disclosed function and process of the present invention. The storage medium may include, but is not limited to, any type of conventional floppy disks, optical disks, CD-ROMs, magneto-optical disks, ROMs, RAMs, EPROMs, EEPROMs, magnetic or optical cards, or any other suitable media for storing electronic instructions.

It is also to be noted that, besides those already mentioned above, many modifications and variations of the above embodiments may be made without departing from the novel and advantageous features of the present invention. Accordingly, all such modifications and variations are intended to be included within the scope of the appended claims.

What is claimed is:

1. A temperature measurement method for measuring temperature of a measurement target object to which a temperature sensor cannot be fixed directly, comprising:

obtaining an observed temperature from the temperature sensor arranged in a vicinity of the measurement target object and a temperature observation time from a timer; and calculating the temperature of the measurement target object $T_{obj}$ according to the observed temperature and the temperature observation time by a calculation processing based on a following equation (C):

$$T_{obj}(t_1) = G_{in} \cdot f(\Delta t_{obs}) \cdot \Delta t_{obs} + T_{obj}(t_0) \quad (C)$$

where $t_1$ is a current time at which the observed temperature is observed, $t_0$ is a time at which temperature was measured last time, $G_{in}$ is a time change rate of temperature applied to the measurement target object, $f(\Delta t_{obs})$ is a polynomial regarding $\Delta t_{obs}$, and $\Delta t_{obs}$ is a time interval by which temperature has been observed.

2. The temperature measurement method of claim 1, wherein the calculation processing is carried out by using a following equation (D):

$$T_{obj}(t_1) = \{G_{in} \cdot f(\Delta t_{obs}) + X \cdot G_{air}\} \cdot \Delta t_{obs} + T_{obj}(t_0) \quad (D)$$

where X is a proportion factor and $G_{air}$ is a time change rate of an atmospheric temperature.

3. The temperature measurement method of claim 1, wherein the calculation processing is carried out by using a following equation (E):

$$T_{obj}(t_1) = \{D(G_{air}) \cdot G_{in} \cdot f(\Delta t_{obs})\} \cdot \Delta t_{obs} + T_{obj}(t_0) \quad (E)$$

where $D(G_{air})$ is a gain function expressed as a polynomial of a time change rate $G_{air}$ of an atmospheric temperature.

4. The temperature measurement method of claim 1, wherein the obtaining step obtains the observed temperature from the temperature sensor set in contact with another object which has transient temperature characteristics identical to those of the measurement target object and which is arranged in a vicinity of the measurement target object.

5. A temperature meter for measuring temperature of a measurement target object to which a temperature sensor cannot be fixed directly, comprising:

a temperature sensor configured to measure an observed temperature in a vicinity of the measurement target object;

a timer configured to measure a temperature observation time; and a calculation processor configured to calculate the temperature of the measurement target object $T_{obj}$ according to the observed temperature and the temperature observation time by a calculation processing based on a following equation (C):

$$T_{obj}(t_1) = G_{in} \cdot f(\Delta t_{obs}) \cdot \Delta t_{obs} + T_{obj}(t_0) \quad (C)$$

where $t_1$ is a current time at which the observed temperature is observed, $t_0$ is a time at which temperature was measured last time, $G_{in}$ is a time change rate of temperature applied to the measurement target object, $f(\Delta t_{obs})$ is a polynomial regarding $\Delta t_{obs}$, and $\Delta t_{obs}$ is a time interval by which temperature has been observed.

6. The temperature meter of claim 5, wherein the calculation processor carries out the calculation processing by using a following equation (D):

$$T_{obj}(t_1) = \{G_{in} \cdot f(\Delta t_{obs}) + X \cdot G_{air}\} \cdot \Delta t_{obs} + T_{obj}(t_0) \quad (D)$$

where X is a proportion factor and $G_{air}$ is a time change rate of an atmospheric temperature.

7. The temperature meter of claim 5, wherein the calculation processor carries out the calculation processing by using a following equation (E):

$$T_{obj}(t_1) = \{D(G_{air}) \cdot G_{in} \cdot f(\Delta t_{obs})\} \cdot \Delta t_{obs} + T_{obj}(t_0) \quad (E)$$

where $D(G_{air})$ is a gain function expressed as a polynomial of a time change rate $G_{air}$ of an atmospheric temperature.

8. The temperature meter of claim 5, wherein the temperature sensor is set in contact with another object which has transient temperature characteristics identical to those of the measurement target object and which is arranged in a vicinity of the measurement target object.

9. The temperature meter of claim 5, wherein the timer and the calculation processor are integrally provided in a form of a temperature measurement circuit.

10. A computer usable medium having computer readable program codes embodied therein for causing a computer to function as a temperature meter for measuring temperature of a measurement target object to which a temperature sensor cannot be fixed directly, the computer readable program codes include:

a computer readable program code for causing said computer to calculate the temperature of the measurement target object $T_{obj}$ according to an observed temperature obtained from a temperature sensor arranged in a vicinity of the measurement target object and a temperature observation time obtained from a timer, by a calculation processing based on a following equation (C):

$$T_{obj}(t_1) = G_{in} \cdot f(\Delta t_{obs}) \cdot \Delta t_{obs} + T_{obj}(t_0) \quad (C)$$

where $t_1$ is a current time at which the observed temperature is observed, $t_0$ is a time at which temperature was measured last time, $G_{in}$ is a time change rate of temperature applied to the measurement target object, $f(\Delta t_{obs})$ is a polynomial regarding $\Delta t_{obs}$, and $\Delta t_{obs}$ is a time interval by which temperature has been observed.

11. A temperature measurement method for measuring temperature of a measurement target object to which a temperature sensor cannot be fixed directly, comprising:

arranging another object which has transient temperature characteristics identical to those of the measurement target object, in a vicinity of the measurement target object; and measuring the temperature of the measurement target object according to an observed temperature obtained from the temperature sensor that is set in contact with the another object.

12. A temperature meter for measuring temperature of a measurement target object to which a temperature sensor cannot be fixed directly, comprising:

another object which has transient temperature characteristics identical to those of the measurement target object, and which is arranged in a vicinity of the measurement target object; and a temperature sensor that is set in contact with the another object, for measuring an observed temperature of the another object as the temperature of the measurement target object.

* * * * *